(12) United States Patent
Trowell et al.

(10) Patent No.: US 9,016,410 B2
(45) Date of Patent: Apr. 28, 2015

(54) CONTROLLER AND CONTROL METHOD FOR A MOTORISED VEHICLE

(75) Inventors: Matthew John Trowell, Christchurch (GB); Jason David Lewis, West Glamorgan (GB)

(73) Assignee: Penny & Giles Controls Limited, Christchurch, Dorset (GB)

( * ) Notice: Subject to any disclaimer, the term of this patent is extended or adjusted under 35 U.S.C. 154(b) by 960 days.

(21) Appl. No.: 12/780,748

(22) Filed: May 14, 2010

(65) Prior Publication Data

US 2011/0232977 A1 Sep. 29, 2011

(30) Foreign Application Priority Data

Mar. 24, 2010 (GB) .................................. 1004985.6

(51) Int. Cl.
*B62D 11/00* (2006.01)
*B62D 11/02* (2006.01)
*B60L 3/10* (2006.01)

(52) U.S. Cl.
CPC .............. *B60L 3/102* (2013.01); *Y02T 10/7258* (2013.01)

(58) Field of Classification Search
USPC ........... 701/22, 41, 1, 78; 180/6.5, 6.48, 65.1, 180/8.1, 9.1, 6.28, 6.2, 53.1, 446, 422, 248, 180/408, 197, 168; 318/59, 66, 68, 69, 70, 318/71, 258, 575, 587
See application file for complete search history.

(56) References Cited

U.S. PATENT DOCUMENTS

| | | | | |
|---|---|---|---|---|
| 3,133,237 A | * | 5/1964 | Miller | 318/145 |
| 3,597,674 A | * | 8/1971 | Abbey | 363/89 |
| 3,787,723 A | * | 1/1974 | Magnuson et al. | 318/823 |
| 4,369,397 A | * | 1/1983 | Read | 318/54 |
| 5,033,000 A | | 7/1991 | Littlejohn et al. | |
| 5,304,912 A | * | 4/1994 | Kajiwara et al. | 318/802 |
| 5,307,888 A | | 5/1994 | Urvoy | |
| 5,487,437 A | * | 1/1996 | Avitan | 180/6.5 |
| 5,719,565 A | * | 2/1998 | Tsuno et al. | 340/905 |
| 6,041,285 A | * | 3/2000 | Young et al. | 702/113 |

(Continued)

FOREIGN PATENT DOCUMENTS

| | | |
|---|---|---|
| GB | 1395380 A | 5/1975 |
| JP | 63262002 A | 10/1988 |

(Continued)

OTHER PUBLICATIONS

"enAble40 Powerchair Control System", product manual produced by Curtis Instruments, Inc. of New York, USA.

(Continued)

*Primary Examiner* — Jason Holloway
*Assistant Examiner* — Rachid Bendidi
(74) *Attorney, Agent, or Firm* — James F. Hann; Haynes Beffel & Wolfeld LLP

(57) ABSTRACT

The technology disclosed relates to a controller and a control method for a motorized vehicle, and in particular to the control of a motorized vehicle having at least a left wheel and a right wheel, the left wheel being driven by a left motor and the right wheel being driven by a right motor. In accordance with such motorized vehicles, linear motion of the vehicle is typically effected by driving the left motor and the right motor in the same direction, while spinning of the vehicle is typically effected by driving the left motor and the right motor in opposite directions. A typical example of such a motorized vehicle is an electric wheelchair.

24 Claims, 7 Drawing Sheets

(56) References Cited

U.S. PATENT DOCUMENTS

| | | | |
|---|---|---|---|
| 6,154,690 A * | 11/2000 | Coleman | 701/1 |
| 6,329,771 B1 * | 12/2001 | Choi et al. | 318/66 |
| 6,481,514 B2 * | 11/2002 | Takada | 180/11 |
| 6,615,937 B2 * | 9/2003 | Richey et al. | 180/6.5 |
| 6,734,647 B2 * | 5/2004 | Wakitani et al. | 318/432 |
| 7,138,772 B2 * | 11/2006 | Noro et al. | 318/400.01 |
| 7,159,181 B2 * | 1/2007 | Mansell et al. | 715/744 |
| 7,425,007 B2 * | 9/2008 | Johannes de Kruijf | 280/250.1 |
| 7,615,943 B2 * | 11/2009 | Egami et al. | 318/139 |
| 7,854,279 B2 * | 12/2010 | Nakajima et al. | 180/6.5 |
| 7,898,203 B2 * | 3/2011 | Davis et al. | 318/490 |
| 7,974,753 B2 * | 7/2011 | Kuo et al. | 701/41 |
| 8,073,585 B2 * | 12/2011 | Jaenke et al. | 701/31.6 |
| 8,127,875 B2 * | 3/2012 | Mattes et al. | 180/65.8 |
| 2002/0011361 A1 * | 1/2002 | Richey et al. | 180/6.5 |
| 2007/0080656 A1 * | 4/2007 | Koerlin | 318/432 |
| 2007/0208483 A1 * | 9/2007 | Rabin | 701/72 |
| 2010/0007299 A1 | 1/2010 | Davis et al. | |
| 2010/0114433 A1 * | 5/2010 | Lewis | 701/41 |
| 2010/0138128 A1 * | 6/2010 | Strothmann et al. | 701/72 |

FOREIGN PATENT DOCUMENTS

| | | |
|---|---|---|
| JP | 07203606 A | 8/1995 |
| WO | 2008/065322 A1 | 6/2008 |

OTHER PUBLICATIONS

International Search Report for Application No. GB1004985.6, dated Jul. 29, 2010.

* cited by examiner

CONTROLLER AND CONTROL METHOD FOR A MOTORISED VEHICLE

RELATED APPLICATIONS

This application claims the benefit of United Kingdom Application No. 104985.6, filed Mar. 24, 2010. The priority application is hereby incorporated by reference.

This application is related to U.S. patent application Ser. No. 12/780,782 entitled "A Controller and Control Method for a Motorised Vehicle", filed 14 May 2010. The related application is incorporated by reference.

BACKGROUND OF THE INVENTION

1. Field of the Invention

The technology disclosed relates to a controller and a control method for a motorised vehicle, and in particular to the control of a motorised vehicle having at least a left wheel and a right wheel, the left wheel being driven by a left motor and the right wheel being driven by a right motor. In accordance with such motorised vehicles, linear motion of the vehicle is typically effected by driving the left motor and the right motor in the same direction, whilst spinning of the vehicle is typically effected by driving the left motor and the right motor in opposite directions. A typical example of such a motorised vehicle is an electric wheelchair.

2. Description of the Prior Art

Motion of a motorised vehicle such as an electric wheelchair is typically effected by a left and right wheel which can be driven independently. Substantially forward and reverse motion of the vehicle is produced by driving the left and right wheel in the same direction, whilst turning of the vehicle is achieved by driving the left and right wheel at different speeds. Indeed the vehicle may even be caused to spin without substantial linear motion by driving the left and right wheel in opposite directions.

It is known to drive such left and right wheels of a motorised vehicle by means of a motor, such as an electric motor, connected to each wheel. Control circuitry is typically provided to respond to command signals from a user interface (such as a joystick) and to cause appropriate voltages to be applied to each motor to bring about the motion requested by the user.

It is further known that the performance of an electric motor, in particular the speed at which it causes an associated wheel to rotate, depends not only on the voltage applied to the motor, but also on the load which is experienced by that motor. When the load increases, for example when the vehicle is climbing a slope, the increased load will cause the motor to turn more slowly for a given supply voltage. In order to counteract such effects, it is known for motorised vehicles such as electric wheelchairs to comprise motor control circuitry which implements a technique known as IR compensation. According to this technique, the motor control circuitry monitors the left and right motor in terms of their instantaneous voltage and current consumption. From these the motor control circuitry can determine the motor speed (primarily determined by the applied armature voltage) and the motor torque (primarily determined by the armature current). The motor control circuitry can then identify situations in which the load on a motor increases (resulting in greater motor torque) by virtue of an increase in the armature current. The real motor speed can be estimated in accordance with the equation:

$$\text{Speed} = k_{emf}(V_m - (I_m \times R_m))$$

where $k_{emf}$ is the back e.m.f. constant, $V_m$ is the voltage applied to the motor, $I_m$ is the current drawn by the motor and is the resistance of the motor windings (armature). A difference between this real motor speed and the requested motor speed is then calculated and a correction is applied, such that for example when the real motor speed drops due to an increase in load, the motor control circuitry compensates by increasing the voltage supplied to that motor to maintain the requested speed.

However, it has been found that such compensation based feedback mechanisms can make a motorised vehicle such as an electric wheelchair rather unstable when turning. This effect is particularly pronounced when the vehicle is a front wheel drive vehicle, as is often the case for an electric wheelchair. This turn instability for a front wheel drive vehicle results from the fact that the trailing centre of mass of a front wheel drive vehicle (consisting mainly of the weight of the user and the weight of the heavy-duty batteries which power the vehicle) causes the driving torque on the inside wheel to increase, and hence slow down. This has the effect that the radius of turn of the vehicle decreases, without the user having requested such a change in turn radius. The tighter turn radius leads to a higher centripetal force acting on the vehicle (since centripetal force is inversely proportional to turn radius) and this further increases the driving torque on the inside wheel, causing an even tighter turn radius. A true vicious circle thus results, which could have serious consequences for the user of the vehicle.

It should be noted that this turn instability problem in practice also affects straight line driving. Whilst a user of the vehicle may seek to drive in a straight line, small left or right deviations will always be present (corresponding to a very large turn radius) and any small offset in turning direction (also known as spin demand) will lead to an even tighter turn with positive feedback. The user has to manually compensate and is constantly fighting to keep the vehicle driving straight. The resulting "fish tailing" is an undesirable phenomenon for the user.

A related problem also arises for front wheel vehicles when driving on a camber. The position of the centre of mass of the vehicle behind the front wheels causes the uphill wheel load to increase, and hence slow down, turning the vehicle up the slope. This effect (known as "camber veer") can be particularly problematic for front wheel drive wheelchairs which implement a "gate shaping algorithm", since this tends to slow the wheelchair down as the spin demand increases, and thus only a small correction window is available to the user seeking to avoid this veering effect.

Some background technological information to the technology disclosed can be found in the "enAble40 Powerchair Control System" manual produced by Curtis Instruments, Inc. of New York, USA; in U.S. Pat. Nos. 5,033,000 and 5,307,888; and in U.S. Patent Application Publication 2010/0007299 A1.

Accordingly it would be desirable to provide an improved technique for controlling such motorised vehicles.

SUMMARY OF THE INVENTION

According to a first aspect, the technology disclosed provides a controller for a motorised vehicle having at least a left wheel and a right wheel, said left wheel being driven by a left motor and said right wheel being driven by a right motor, the controller being arranged to receive control signals from a user input device of the motorised vehicle, the controller comprising: motor monitoring circuitry configured to monitor output signals from said left motor and said right motor respectively, and to detect in dependence on said output signals a loading imbalance between said left motor and said right motor; and motor control circuitry configured on detection of said loading imbalance to apply a slowing correction to a less loaded motor of said left motor and said right motor.

According to the techniques of the technology disclosed a controller for the motorised vehicle comprises motor monitoring circuitry which monitors output signals from each of the motors, and in dependence on those output signals can detect the occurrence of a loading imbalance between the motors. When such a loading imbalance is detected, the motor control circuitry then applies a slowing correction to the less loaded of the two motors. According to prior art techniques, the detection of one of the motors being more greatly loaded than the other would typically be responded to by increasing the power to that more greatly loaded motor. This is due to the fact that each motor is usually monitored individually and corrections are applied to each motor in dependence on its own loading situation. For example in the case of an electric wheelchair, increased load on one motor would result in a higher voltage being applied to that motor, seeking to match its real speed output to that requested by the user. However, the inventor of the technology disclosed realised that the above described control problems (such as turn instability and camber veer) cannot be fully solved by this known approach, and has found that a significant improvement in the controllability of such motorised vehicles results from providing motor control circuitry configured to monitor both motors and to apply a slowing correction to the less loaded motor, when a loading imbalance is detected.

There are a number of ways in which the motor control circuitry could determine an appropriate slowing correction, but in one embodiment said control signals determine a demanded turn radius of the motorised vehicle and said motor control circuitry is configured to apply said slowing correction to preserve said demanded turn radius. It will be appreciated that the control signals from the user input device of the motorised vehicle will determine a demanded turn radius which the user wishes the motorised vehicle to take. Of course this demanded turn radius can be extremely large—when the user wishes to travel in a straight line. By determining the slowing correction so as to preserve the demanded turn radius when a loading imbalance between the left and right motor occurs, the controlling characteristics of the motorised vehicle are improved, since the vehicle responds to the user commands in a manner which more accurately reflects the user's wishes.

There are various ways in which the control signals could be converted into motion of the motorised vehicle, but in embodiments said control signals determine a left motor demand speed and a right motor demand speed, said left motor being controlled in dependence on said left motor demand speed and said right motor being controlled in dependence on said right motor demand speed. Hence by establishing a demand speed for each of the left and right motors respectively, the left and right motors may be simply controlled in dependence on their respective demand speeds.

In one embodiment, the motor control circuitry is configured to apply said slowing correction by reducing one of said left motor demand speed and said right motor demand speed. Hence, the slowing correction may be applied in response to the detection of the loading imbalance by reducing the demand speed corresponding to the less loaded motor.

In other embodiments, said controller comprises a left feedback control loop, wherein said left feedback control loop comprises a left motor speed feedback unit configured to generate a feedback left motor speed in dependence on said output signals from said left motor; a right feedback control loop, wherein said right feedback control loop comprises a right motor speed feedback unit configured to generate a feedback right motor speed in dependence on said output signals from said right motor; and said motor control circuitry comprises comparison circuitry for controlling said left motor in dependence on a difference between said left motor demand speed and said feedback left motor speed, and for controlling said right motor in dependence on a difference between said right motor demand speed and said feedback right motor speed.

Generating a feedback motor speed in each of the left and right motors in dependence on the output signals from those motors provides a feedback mechanism for the motor control circuitry to control each of the left and right motors in a stable manner, controlling each motor in dependence on a difference between the feedback motor speed and the demand speed for that motor. This enables the motor control circuitry to adjust the performance of the left and right motor in dependence on a measurement on their current performance.

In such embodiments, said motor control circuitry may be configured to apply said slowing correction by increasing one of said feedback left motor speed and said feedback right motor speed. Thus, in order to apply the slowing correction to one of the motors, this may be effected by increasing the feedback motor speed of that motor, such that the comparison circuitry of the motor control circuitry determines that that motor is (from the point of view of the comparison circuitry) currently turning faster than it has been requested to do, and thus reduces the motor speed.

The output signals from the left motor and the right motor could take a number of forms, but in embodiments said output signals from said left motor and said right motor respectively comprise a left motor current consumption and a right motor current consumption respectively. In a motorised vehicle driven by electric motors, the current consumption of each motor is indicative of the load experienced by that motor, and hence monitoring the current consumption of the left and right motor respectively enables the loading imbalance to be detected.

In some such embodiments, said left motor speed feedback unit comprises a left IR compensation unit configured to generate said feedback left motor speed in dependence on said left motor current consumption, and said right motor speed feedback unit comprises a right IR compensation unit configured to generate said feedback right motor speed in dependence on said right motor current consumption. An IR compensation unit for each of the left and right motors respectively allows the controller to compensate for the armature resistance in each motor and hence maintain the output speed of each motor at a desired level, even as the load on that motor changes. To avoid the control problem of "positive-feedback", only partial compensation by this method can be made.

In some embodiments said motor monitoring circuitry further comprises motor speed determination circuitry configured to use full compensation to determine an actual left motor speed and an actual right motor speed in dependence on said output signals from said left motor and said right motor respectively. Determining the actual speed of the left motor and right motor respectively enables the motor monitoring circuitry to allow the motor control circuitry to control each motor in dependence on its determined actual speed and hence a more stable speed performance of each motor may be achieved.

In some embodiments, the motor control circuitry is configured to determine said slowing correction in dependence on said actual left motor speed and said actual right motor speed. Determining the slowing correction in this manner, namely taking both the actual left motor speed and the actual right motor speed into account, enables the slowing correction to be determined such that the overall motion of the motorised vehicle is taken into account, in particular the turn radius of the motorised vehicle.

In some embodiments said feedback left motor speed is increased by a factor CL given by the formula:

$$CL = \frac{VL_{Real} \cdot VR_{Feedback}}{VR_{Real}} - VL_{Feedback},$$

where $VL_{Feedback}$ and $VR_{Feedback}$ are said feedback left motor speed and said feedback right motor speed respectively, and where $VL_{real}$ and $VR_{real}$ are said actual left motor speed and said actual right motor speed respectively.

In some embodiments said feedback right motor speed is increased by a factor CR given by the formula:

$$CR = \frac{VR_{Real} \cdot VL_{Feedback}}{VL_{Real}} - VR_{Feedback},$$

where $VL_{Feedback}$ and $VR_{Feedback}$ are said feedback left motor speed and said feedback right motor speed respectively, and where $VL_{real}$ and $VR_{real}$ are said actual left motor speed and said actual right motor speed respectively.

In some such embodiments said motor control circuitry is configured to limit said slowing correction for said left motor to a magnitude of said actual right motor speed and to limit said slowing correction for said right motor to a magnitude of said actual left motor speed. At small values of the actual motor speed of one motor, the slowing correction required for the other motor may become impossibly large and limiting the slowing correction of one motor to the magnitude of the actual motor speed of the other motor avoids this problem.

In some embodiments, said motor control circuitry is configured to reduce said slowing correction when an actual speed of said motorised vehicle is less than a predetermined speed. It has been found that the techniques of the technology disclosed are particularly applicable at higher speeds of the motorised vehicle and that a more stable driving experience results when the applied slowing correction is reduced at lower overall speeds of the motorised vehicle.

In some embodiments, said motorised vehicle is a front wheel drive vehicle. In particular the motor control circuitry may then be configured only to apply said slowing correction when said front wheel drive vehicle is moving forwards. As discussed above, the location of the centre of mass of a front wheel drive vehicle behind the driven wheels when that vehicle is driving forwards results in the need for stabilisation which the technology disclosed provides.

Conversely, in other embodiments, the motorised vehicle is a rear wheel drive vehicle and then the motor control circuitry may be configured only to apply said slowing correction when said rear wheel drive vehicle is moving backwards.

The loading imbalance may have a number of sources, but in embodiments said loading imbalance arises due to one or more of the following phenomena increasing the loading on one of said left wheel and said right wheel: (a) friction between at least one of said left wheel and said right wheel and a surface on which the motorised vehicle is driving; (b) a required realignment of castor wheels of the motorised vehicle when the motorised vehicle is turning; (c) weight of the user of the motorised vehicle; (d) a slope on which the motorised vehicle is driving; (e) a centripetal force; and (f) climbing or descending an uneven obstacle.

Embodiments of the technology disclosed comprise a controller for use in a motorised vehicle taking the form of a wheelchair.

Viewed from a second aspect, the technology disclosed provides a motorised vehicle comprising: at least a left wheel and a right wheel, said left wheel being driven by a left motor and said right wheel being driven by a right motor; a user input device configured to issue control signals for the motorised vehicle; and a controller according to the first aspect for controlling the driving of said left wheel and said right wheel in dependence on said control signals.

In some embodiments, said motorised vehicle is a wheelchair.

Viewed from a third aspect, the technology disclosed provides a method of controlling a motorised vehicle having at least a left wheel and a right wheel, said left wheel being driven by a left motor and said right wheel being driven by a right motor, comprising the steps of: receiving control signals from a user input device of the motorised vehicle; monitoring output signals from said left motor and said right motor respectively; detecting in dependence on said output signals a loading imbalance between said left motor and said right motor; and on detection of said loading imbalance applying a slowing correction to a less loaded motor of said left motor and said right motor.

Viewed from a fourth aspect, the technology disclosed provides a computer program product comprising a computer program which when executed on a computing device causes a motorised vehicle having at least a left wheel and a right wheel, said left wheel being driven by a left motor and said right wheel being driven by a right motor, to be controlled in accordance with the method of the third aspect.

Viewed from a fifth aspect, the technology disclosed provides a controller for a motorised vehicle having at least a left wheel and a right wheel, said left wheel being driven by a left motor and said right wheel being driven by a right motor, the controller being arranged to receive control signals from a user input device of the motorised vehicle, the controller comprising: motor monitoring means for monitoring output signals from said left motor and said right motor respectively, and for detecting in dependence on said output signals a loading imbalance between said left motor and said right motor; and motor control means for, on detection of said loading imbalance, applying a slowing correction to a less loaded motor of said left motor and said right motor.

The above, and other objects, features and advantages of this invention will be apparent from the following detailed description of illustrative embodiments which is to be read in connection with the accompanying drawings.

DETAILED DESCRIPTION

Figure 1:
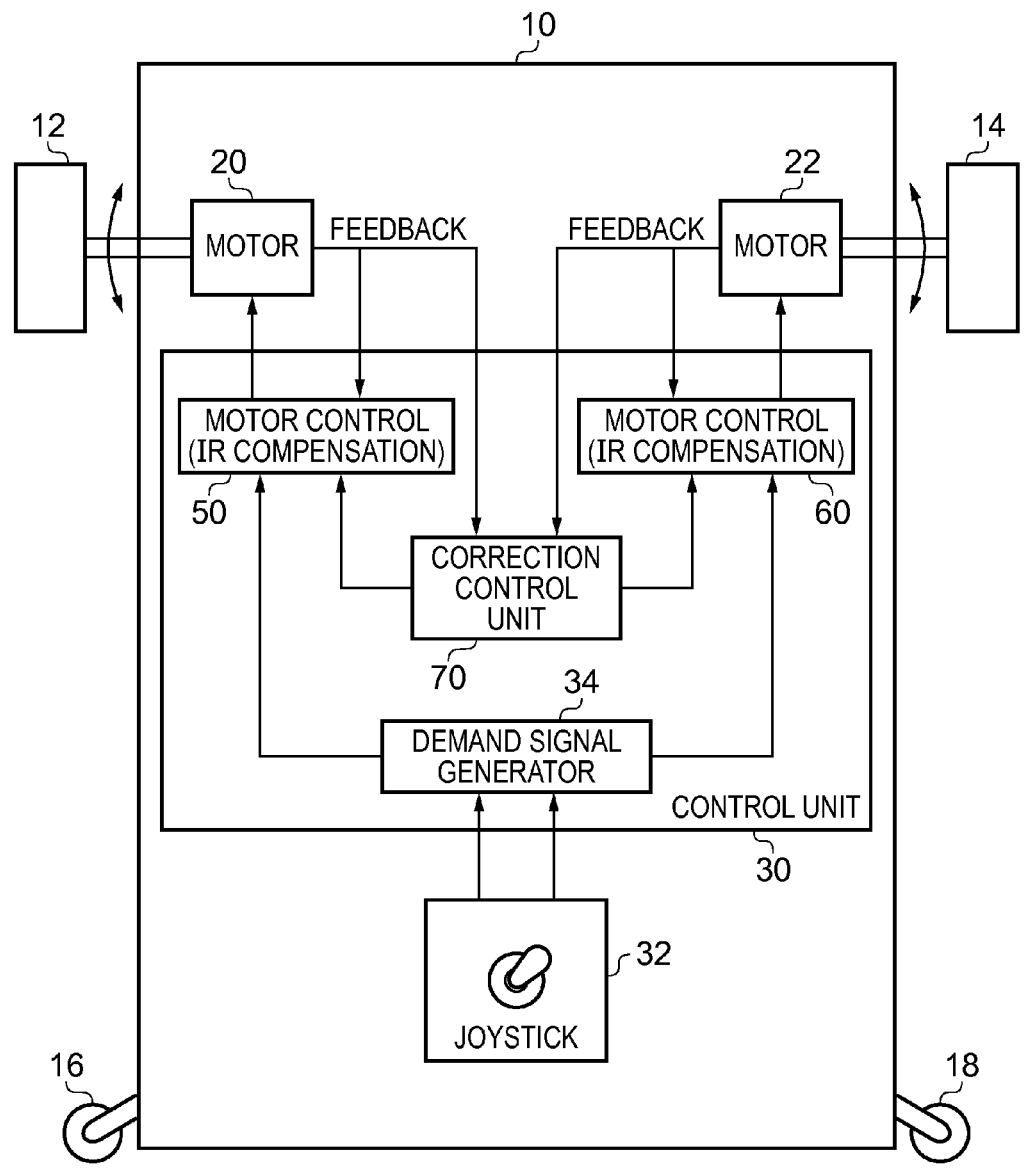
FIG. 1 schematically illustrates a motorised vehicle according to one embodiment.

FIG. 1 is a block diagram of a motorised vehicle in accordance with one embodiment of the present invention. For the purposes of the following discussion, the example where the motorised vehicle is an electric wheelchair will be used. In the example of FIG. 1, the electric wheelchair has a chassis 10 to which two motor driven wheels are connected, namely a left wheel 12 and a right wheel 14. Further, a pair of castors 16, 18 are also provided on the chassis which rotate to follow the direction of travel of the wheelchair. In the illustrated example, the wheelchair is a front wheel drive wheelchair, so that the castors 16, 18 typically follow the direction in which the driven wheels 12, 14 lead (except of course when the wheelchair is in reverse). Each of the two motor driven wheels 12, 14 are driven independently by a motor. In the embodiments illustrated, the left wheel 12 is driven by the motor 20 and the right wheel 14 is driven by the motor 22. To make the vehicle move forwards or backwards both wheels are driven in the same direction. To make the vehicle turn to the left or right whilst driving, the wheels are driven the same direction but with different speeds. It is also possible to effect an even tighter turning of the wheelchair, by driving the two wheels 12, 14 in opposite directions, which causes the wheelchair to spin on the spot.

Whilst in FIG. 1 the driven wheels are provided at the front of the wheelchair and the castors 16, 18 are provided towards the back, it will be appreciated that in an alternative embodiment the driven wheels may be at the rear and the castors may be at the front. Indeed, in further embodiments the driven wheels may be provided in the middle of the wheelchair, with a selection of castors and other fixed non-driven wheels also being provided to stabilise the wheelchair chassis 10. As shown in FIG. 1, a control unit 30 is provided on the wheelchair chassis 10 which is coupled to an input control module 32 via which a user of the wheelchair can enter drive commands. Whilst the control unit 30 and input control module 32 are shown here as separate elements, it will be appreciated that in some embodiments these components may be incorporated into a single housing. As also shown in FIG. 1, the input control module 32 is, in this example, a joystick, which provides an intuitive user-friendly interface. It should noted that a front wheel drive wheelchair such as that illustrated in FIG. 1 will typically have its joystick mounted near the front of the wheelchair for the convenience of the user. Joystick 32 is positioned in FIG. 1 for schematic clarity alone.

All of the electrical components on the wheelchair receive power from an on-board battery (not illustrated), which is typically a heavy-duty rechargeable battery capable of providing the relatively large currents used to drive the motors 20, 22 during operation of the wheelchair.

The control unit 30 receives control signals from the user input device 32, on the basis of which it generates motor control signals which determine the operation of motors 20, 22. In the illustrated embodiment the joystick 32 is a proportional joystick which provides the control unit 30 with digital control signals indicating a forward component and a spin component. In addition the control unit 30 is configured such that the spin requested by the user is limited in dependence on the requested speed.

In operation, the control unit 30 receives the control signals, and the control signals are passed to demand signal generator 34, which converts the control signals into a left motor demand speed and a right motor demand speed, which are passed to left motor control unit 50 and right motor control unit 60 respectively.

Left motor control unit 50 and right motor control unit 60 generate the direct control signals for the left motor 20 and right motor 22 respectively. In the illustrated embodiment, these are in the form of a voltage applied to each motor, a higher voltage causing the motor to turn faster, the speed of the motor also being dependent on the current load that it is experiencing. Left motor control unit 50 and right motor control unit 60 each form part of a feedback loop, wherein left motor control unit 50 receives feedback signals from left motor 20 and right motor control unit 60 receives feedback signals from right motor 22. Typically the feedback signals from the motors 20, 22 comprise an instantaneous current and voltage measurement of each respective motor. Each motor control unit performs a technique known as IR compensation, wherein the speed of each motor is estimated according to the formula:

$$\text{Speed} = k_{emf}(V_m - (V_m - (I_m \times R_m)))$$

where $k_{emf}$ is the back e.m.f constant, $V_m$ is the voltage applied to the motor, $I_m$ is the current drawn by the motor and $R_m$ is the resistance of the motor windings (also known as the armature resistance).

The value of $R_m$ is programmed to a chosen value and the current drawn by the motor is monitored. As the current varies the voltage applied to motor is varied with the aim of keeping the speed constant whilst the user input is indicating a constant speed should be maintained. This is done by means of a comparator which compares the feedback speed calculated in accordance with the IR compensation formula above with the currently demanded speed (determined by the user controls). It should be noted that in practice the value of $R_m$ used in the IR compensation is typically only a predetermined proportion (e.g. 70%) of the real armature resistance. This enables the feedback loop formed by the motor, the IR compensation and the comparator to operate in a stable regime.

The control unit 30 also comprises correction control unit 70, which also receives the feedback signals from both motor 20 and motor 22. A typical embodiment of the correction control unit 70 is as part of an embedded processor in the control unit of the wheelchair. Further description of such a processor is given below with reference to FIG. 7. The operation of correction control unit 70 will be described in more detail in below, however first it is useful to consider some mathematics underlying the motion of the wheelchair.

The speed and spin of the wheelchair may be defined in terms of the velocities (VL and VR respectively) of the left and right motor 20, 22 as follows:

$$\text{Speed} = \frac{(VL + VR)}{2} \quad\quad \text{Equation 1}$$

$$\text{Spin} = \frac{(VL - VR)}{2}$$

In terms of these quantities the turn radius of the wheelchair may be defined as:

$$TurnRadius = \frac{Laxle}{2} \times \frac{Speed}{Spin} \qquad \text{Equation 2}$$

Where Laxle is the distance between drive wheels 12 and 14. Substituting the expressions for speed and spin from equation 1 into equation 2, the turn radius of the wheelchair may then be defined as follows:

$$TurnRadius = \frac{Laxle}{2} \times \frac{VL + VR}{VL - VR} \qquad \text{Equation 3}$$

It should be understood that in order to calculate the real turn radius of the wheelchair according to Equation 3, the real left and right motor velocities must be used. However the turn radius may also be calculated using the left and right feedback speeds ($VL_{Feedback}$ and $VR_{Feedback}$ respectively) calculated according to the IR compensation formula above for each motor. One may then determine the real turn radius according to these quantities, introducing a correction factor which will cause each motor controller (in particular each comparator) to operate in accordance with the real turn radius of the wheelchair.

For a correction factor CL, introduced as a correction factor to $VL_{Feedback}$, and equating these two ways of calculating the real turn radius, we find:

$$\frac{VL_{Real} + VR_{Real}}{VL_{Real} - VR_{Real}} = \frac{(VL_{Feedback} + CL) + VR_{Feedback}}{(VL_{Feedback} + CL) - VR_{Feedback}} \qquad \text{Equation 4}$$

Rearranging, the "left" correction factor is then given by:

$$CL = \frac{VL_{Real} \cdot VR_{Feedback}}{VR_{Real}} - VL_{Feedback} \qquad \text{Equation 5}$$

whilst a "right" correction factor CR may be similarly determined as:

$$CR = \frac{VR_{Real} \cdot VL_{Feedback}}{VL_{Real}} - VR_{Feedback} \qquad \text{Equation 6}$$

Figure 2:
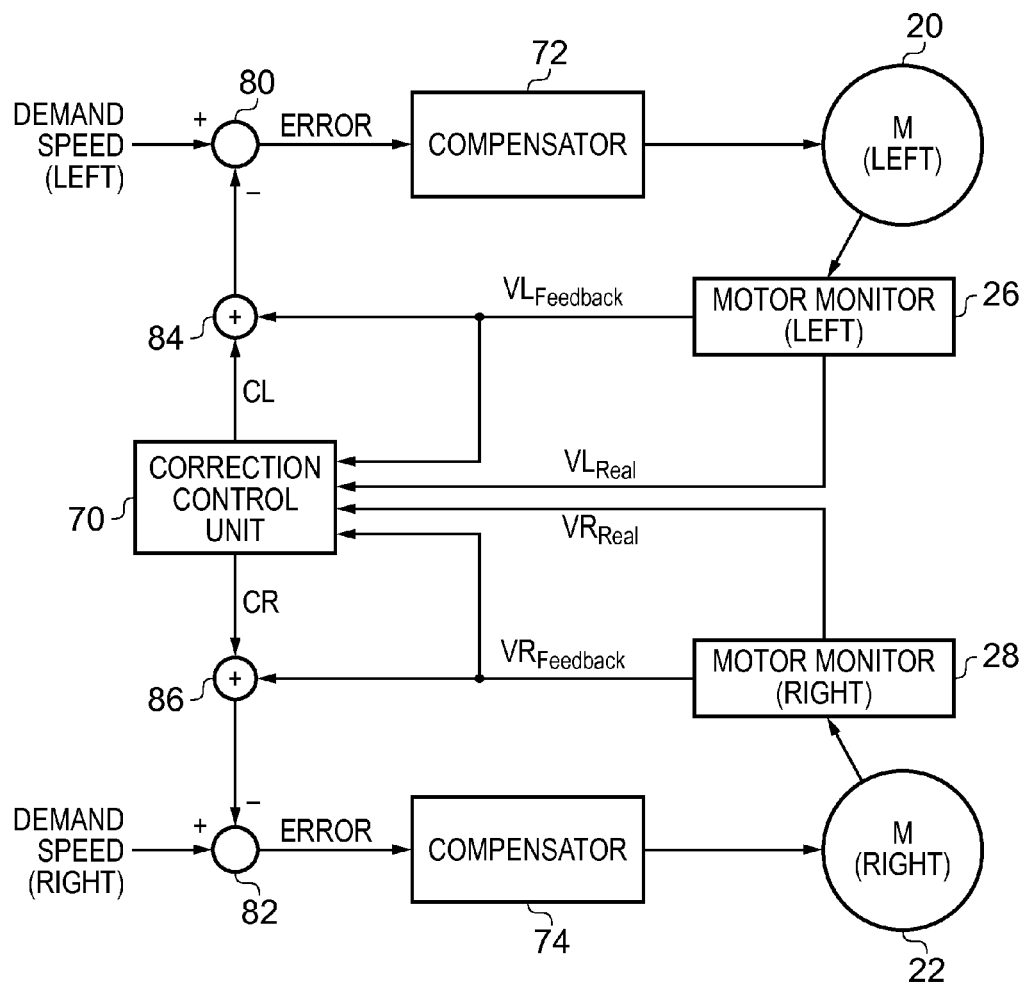
FIG. 2 schematically illustrates in more detail the motor control circuitry shown in FIG. 1.

These correction factors are continuously determined by correction control unit 70, as is now described with reference to FIG. 2. FIG. 2 schematically illustrates in more detail the control circuitry for the left motor 20 and the right motor 22. Left and right demand speeds are received from demand signal generator 34 and each enters a control loop by means of which each motor is controlled.

In operation, motor monitoring circuitry 26 monitors the performance of left motor 20, whilst motor monitoring circuitry 28 monitors the performance of right motor 22. The basic feedback control loop for each motor comprises the respective motor monitoring circuitry performing the above described IR compensation and passing a feedback motor speed which is compared (by comparators 80 and 82 respectively) to the current demand speed, and on this basis an error signal is generated which, via a compensator (72, 74) respectively, determines the input signals for each motor (in particular the voltage applied to each motor).

In accordance with the techniques of the technology disclosed the correction control unit 70 is introduced, which also receives the left and right feedback motor speeds from the monitor monitoring circuitry 26, 28. In addition, the left and right motor monitoring circuitry 26, 28 provide the correction control unit 70 with an estimate of the real speed of each motor ($VL_{real}$ and $VR_{real}$ respectively). The correction control unit 70 then determines the left and right correction factors CL and CR in accordance with equations 5 and 6 above. The correction control unit 70 can then cause a correction factor to be added to either the left feedback motor speed ($VL_{feedback}$) or the right feedback motor speed ($VR_{feedback}$).

Firstly, it should be noted that the correction control unit 70 only applies the correction when both VLreal and VRreal are both positive, i.e. this front wheel drive wheelchair is going forwards. Correction control unit 70 then selects whichever of CL and CR are a positive correction and causes this correction value to be added to the respective feedback path via adder 84, 86 as appropriate. In addition, it has been found that as the real motor speeds ($VL_{real}$ and $VR_{real}$, approach zero, the required correction (CR or CL respectively) tends to infinity. This can be seen from equations 5 and 6. Hence, to prevent this happening, the correction factors are limited by the opposing motor speed, i.e. CL cannot exceed $VR_{real}$ and CR cannot exceed $VL_{real}$. Finally, correction control unit 70 is configured to fade out the corrections CL and CR at lower overall speeds of the wheelchair. It has been found that the techniques of the technology disclosed find the greatest benefit at higher speeds, and can cause some wheelchairs to feel "twitchy" at lower speeds, particularly during acceleration or deceleration. This fading out of the correction is calculated in accordance with equation 7 that follows, which defines a scaling factor for the correction factors in dependence on a predetermined value of FadeVoltage which in this embodiment is set at 10V.

$$LowSpeedFade = \frac{Speed^2}{FadeVoltage^2} \qquad \text{Equation 7}$$

$$\text{where: } Speed = \frac{VL_{Real} + VR_{Real}}{2}$$

Figure 3:
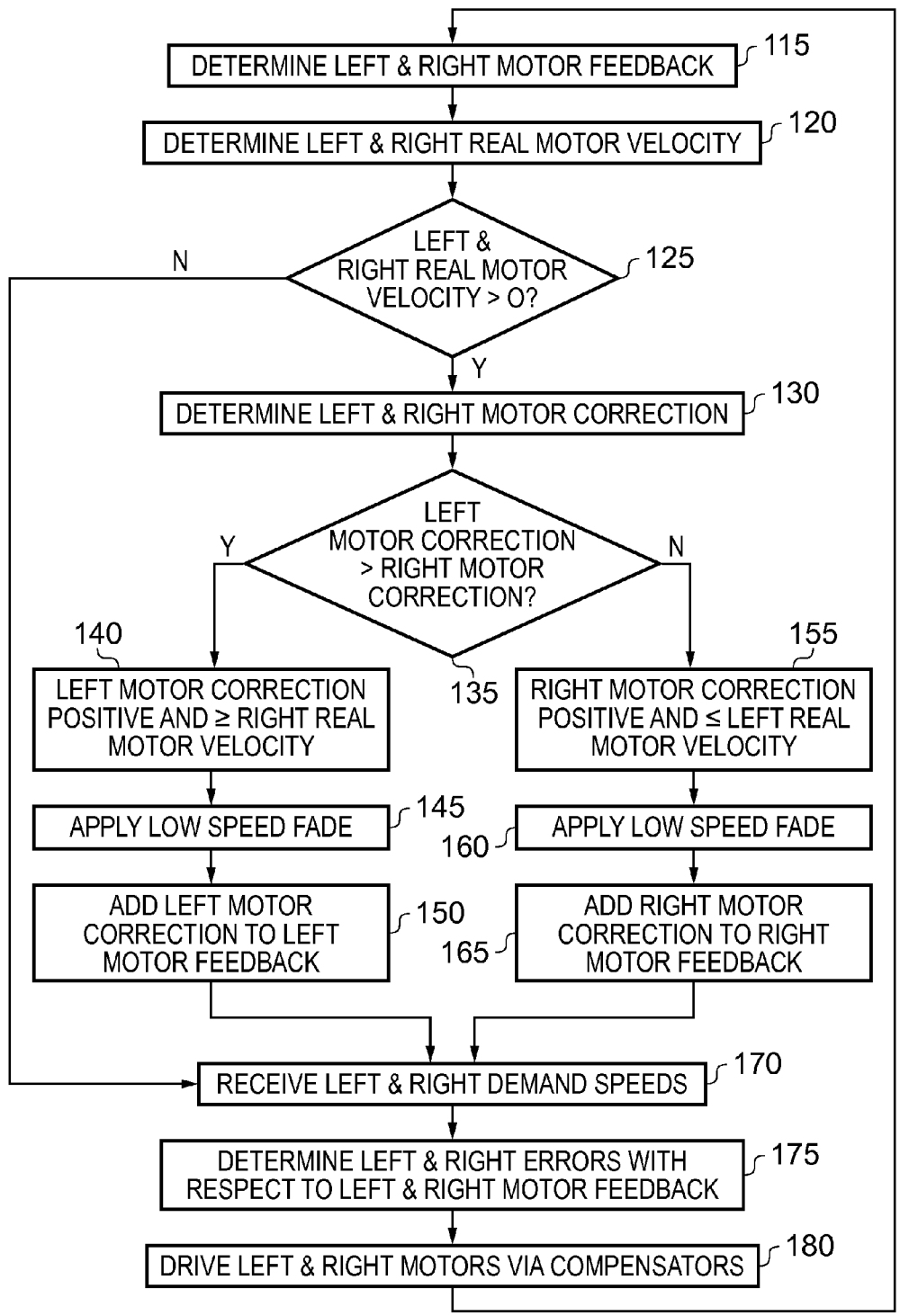
FIG. 3 illustrates a series of steps taken by the motor control circuitry of FIG. 1.

The operation of the motor control circuitry schematically represented in FIG. 2 is now described in terms of a series of steps as schematically set out in FIG. 3. Whilst the steps are described as a continuous flow, the flow can be considered to begin at step 115, where the motor monitoring circuitries 26, 28 determine left and right motor feedback speeds respectively and at step 120 (typically simultaneously with step 115) determine left and right real motor velocities respectively. At step 125 it is determined whether both the left and right real motor velocities are positive. If they are not, then the flow proceeds directly to step 170 (described below).

If however both the left and right real motor velocities are positive then the flow proceeds to step 130, where the correction control unit 70 determines the left and right motor correction values CL and CR. At step 135 it is determined which of these correction values is greater. If the left motor correction value CL is greater then the flow proceeds via the left branch, beginning at step 140 where the left motor correction value CL is constrained to be a positive value, and less than or equal to the current right real motor velocity. At step 145 any appropriate low speed fading factor is applied and at step 150 the left motor correction value CL is added by means of adder 84 to the left motor feedback speed value. The flow then proceeds to step 170. Correspondingly, if at step 135 it is determined that the right motor correction value CR is larger, then the flow proceeds via the right branch, beginning at step 155 where the right motor correction value CR is constrained to be a positive value, and less than or equal to the left real motor velocity. At step 160 any low speed fading factor is applied and at step 165 the right motor correction value CR is added by means of adder 86 to the right motor feedback value. The flow then proceeds to step 170.

At step 170, the left and right demand speeds are received from the demand signal generator 34. Then at step 175 the comparators 80, 82 determine left and right errors with respect to the left and right motor feedback speeds that they are receiving. At step 180, the left and right motors 20, 22 are then driven (via compensators 72, 74) in dependence on the errors values determined by comparators 80, 82 at step 175. The flow then returns to step 115.

Figure 4:
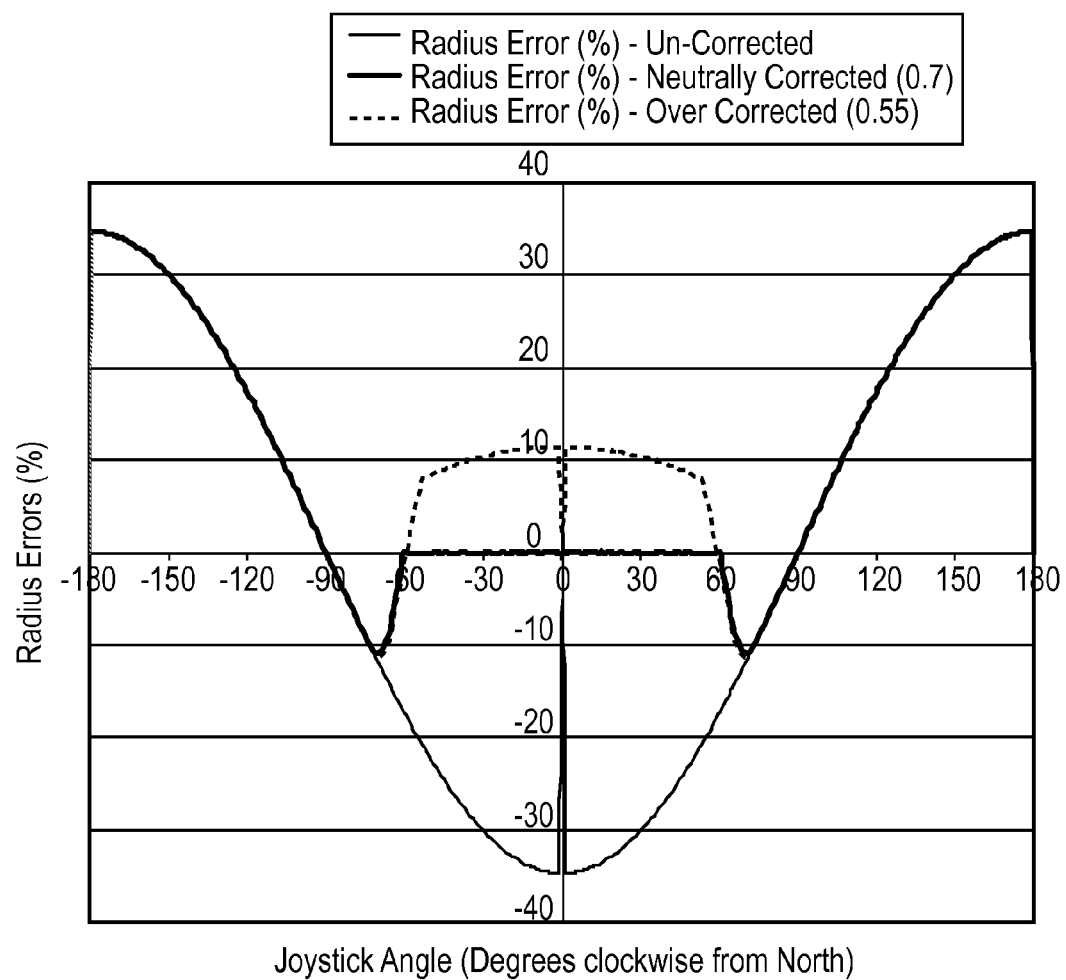
FIG. 4 is a graph showing a simulation of the variation in radius error with joystick angle.
Figure 5:
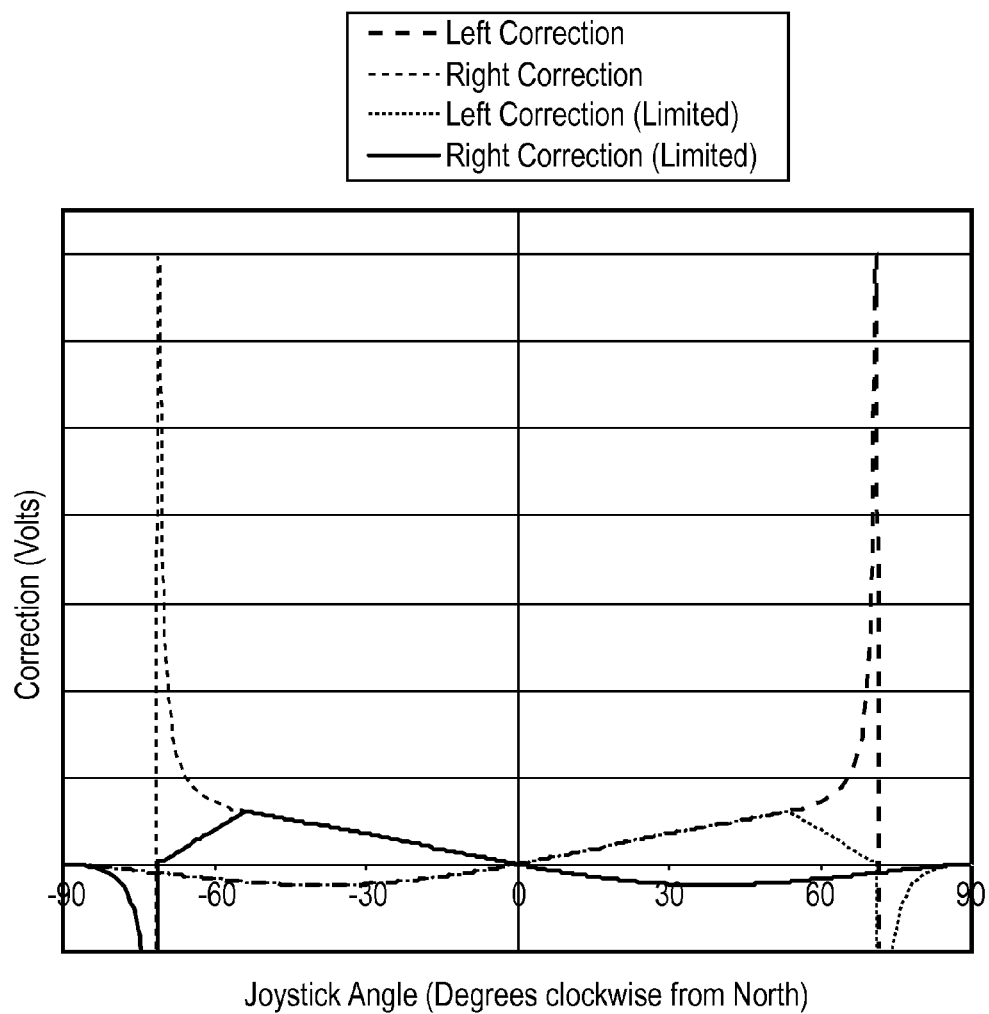
FIG. 5 is a graph showing a simulation of the variation in the applied feedback correction with joystick angle.
Figure 6:
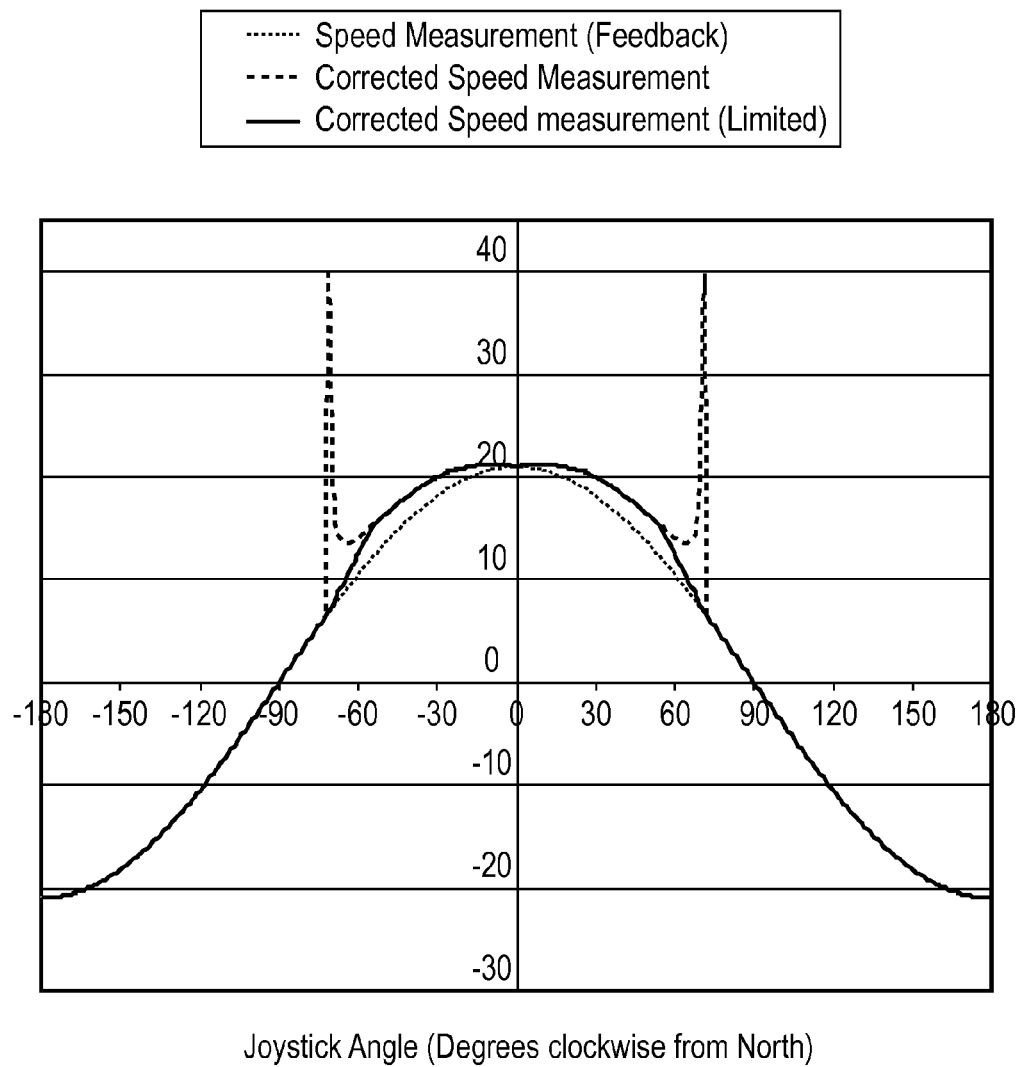
FIG. 6 is a graph showing a simulation of the variation in the wheelchair speed measurement with joystick angle.

Next FIGS. 4, 5 and 6 are discussed which illustrate the results of some simulations carried out for a wheelchair at steady state speed, showing how various quantities are distributed with respect to the joystick angle. In FIG. 4, the "uncorrected" curve illustrates how when the joystick is forward (i.e. between −90° and +90°) a tighter (than demanded) radius of turn results, leading to instability in controlling the chair. The "0.7 corrected" curve shows how the techniques of the technology disclosed can be used to neutralise the negative radius error, and the "0.55 corrected" curve shows how a chosen compensation factor of 0.55 will cause a larger (then demanded) radius of turn, which is naturally stable.

FIG. 5 illustrates a simulation of the left and right correction factors (CL and CR) and clearly demonstrates how the values of these quantities tend to infinity as the opposite motor becomes stationary (see the large spikes at approximately +70° and at approximately −70°). Limiting the correction values to the real speed of the opposite motor, as discussed above, addresses this problem.

FIG. 6 illustrates how the (uncorrected) feedback speed measurement is increased in the forward direction by the techniques of the present invention. Notice that the simulated spikes at ±70° are avoided by limiting the corrected speed measurement with respect to the opposite real motor speed.

In general it has been found that the following improvements were made by introducing techniques of the present invention. Firstly the "fish tailing" effect was reduced. It was found to be much easier to drive in a straight line with the stabilisation algorithm (implementing the techniques of the present invention) switched on. Secondly, "spin-in" on faster turns was reduced. With the stabilisation algorithm switched on it was relatively easy to drive around a four meter diameter circle at full speed. Without the stabilisation algorithm switched on this was difficult, as the wheelchair tended to spiral into a very tight turn. Thirdly, "camber veer" was reduced. When driving across a camber the stabilisation algorithm allowed the wheelchair to continue relatively straight with less tendency to turn up the slope. Furthermore with the stabilisation algorithm switched on, the wheelchair was able to drive faster across a camber, since the usual gate shaping algorithm would normally limit the speed demand as the joystick position was used to manually keep the chair going straight.

Figure 7:
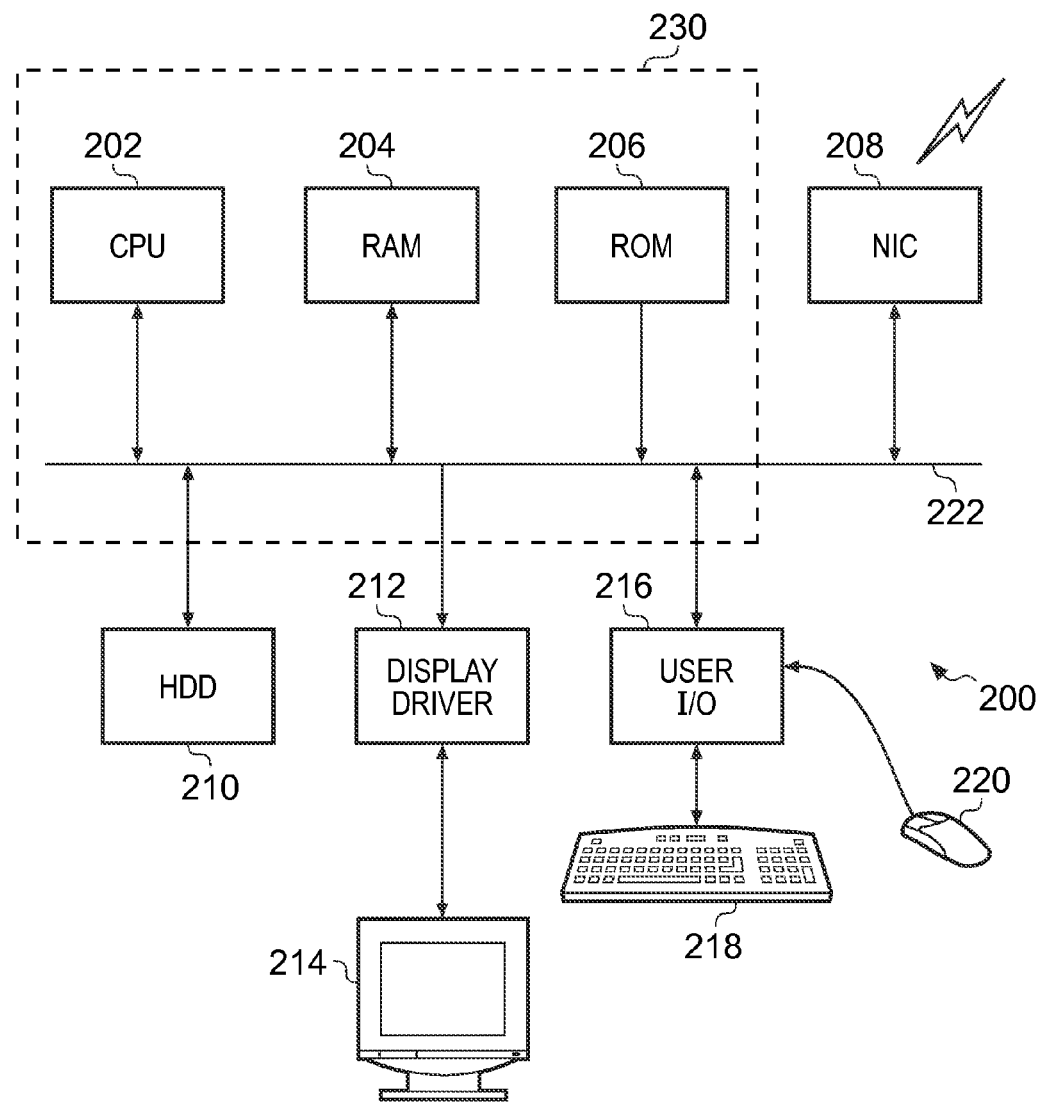
FIG. 7 is a schematic representation of a general purpose computing device which may be used in embodiments of the present invention.

FIG. 7 schematically illustrates a general purpose computing device 200 of the type that may be used to implement the above described techniques. As mentioned above, in the context of the technology disclosed this could for example be an embedded processor forming part of the control unit of the wheelchair. The general purpose computing device 200 includes a central processing unit 202, a random access memory 204 and a read only memory 206, connected together via bus 222. More fully, the general purpose computing device may be extended to further comprise a network interface card 208, a hard disk drive 210, a display driver 212 and monitor 214 and a user input/output circuit 216 with a keyboard 218 and mouse 220 all connected via the common bus 222. In operation, such as when forming part of the control system of an active wheelchair, the central processing unit 202 will execute computer program instructions that may for example be stored in the random access memory 204 and/or the read only memory 206. These core components of the general purpose computing device are labelled 230 in FIG. 9. The additional components outside the dashed box 230 may additionally be connected, for example when the control system is connected to a diagnostic set-up for pre-programming or for troubleshooting. In such a situation program instructions could be additionally retrieved from the hard disk drive 210 or dynamically downloaded via the network interface card 208. The results of the processing performed may be displayed to a user or an engineer via a connected display driver 212 and monitor 214. User inputs for controlling the operation of the general purpose computing device 200 may be received via a connected user input output circuit 216 from the keyboard 218 or the mouse 220. It will be appreciated that the computer program could be written in a variety of different computer languages. The computer program may be stored locally on a recording medium or dynamically downloaded to the general purpose computing device 200. When operating under control of an appropriate computer program, the general purpose computing device 200 can perform the above described techniques and can be considered to form an apparatus for performing the above described technique. The architecture of the general purpose computing device 200 could vary considerably and FIG. 9 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim as follows:

1. A controller for a motorized vehicle having at least a left wheel and a right wheel, said left wheel being driven by a left motor and said right wheel being driven by a right motor, the controller being arranged to receive control signals from a user input device of the motorized vehicle, the controller comprising:

motor monitoring circuitry configured to monitor output signals from said left motor and said right motor respectively;

left IR compensation circuitry configured to use IR compensation to generate a left motor input voltage in dependence on said output signals, where said output signals comprise a left motor voltage and a left motor current consumption;

right IR compensation circuitry configured to use IR compensation to generate a right motor input voltage in dependence on said output signals, where said output signals comprise a right motor voltage and a right motor current consumption;

said motor monitoring circuitry configured to detect in dependence on said output signals a loading imbalance between said left motor and said right motor; and motor control circuitry configured on detection of said loading imbalance to apply a slowing correction to a less loaded motor of said left motor and said right motor.

2. A controller as claimed in claim 1, wherein said control signals determine a demanded turn radius of the motorized vehicle and said motor control circuitry is configured to apply said slowing correction to preserve said demanded turn radius.

3. A controller as claimed in claim 1, wherein said control signals determine a left motor demand speed and a right motor demand speed, said left motor being controlled in dependence on said left motor demand speed and said right motor being controlled in dependence on said right motor demand speed.

4. A controller as claimed in claim 3, wherein said motor control circuitry is configured to apply said slowing correction by reducing one of said left motor demand speed and said right motor demand speed.

5. A controller as claimed in claim 3, wherein said controller comprises:
a left feedback control loop, wherein said left feedback control loop comprises a left motor speed feedback unit configured to generate a feedback left motor speed in dependence on said output signals from said left motor;
a right feedback control loop, wherein said right feedback control loop comprises a right motor speed feedback unit configured to generate a feedback right motor speed in dependence on said output signals from said right motor; and
said motor control circuitry comprises comparison circuitry for controlling said left motor in dependence on a difference between said left motor demand speed and said feedback left motor speed, and for controlling said right motor in dependence on a difference between said right motor demand speed and said feedback right motor speed.

6. A controller as claimed in claim 5, wherein said motor control circuitry is configured to apply said slowing correction by increasing one of said feedback left motor speed and said feedback right motor speed.

7. A controller as claimed in claim 6, wherein said left IR compensation circuitry is configured to generate said feedback left motor speed in dependence on said left motor current consumption, and said right IR compensation circuitry is configured to generate said feedback right motor speed in dependence on said right motor current consumption.

8. A controller as claimed in claim 1, wherein said motor monitoring circuitry further comprises motor speed determination circuitry configured to use full compensation to determine an estimate of the left motor speed and an estimate of the right motor speed in dependence on said output signals from said left motor and said right motor respectively.

9. A controller as claimed in claim 8, wherein said motor control circuitry is configured to determine said slowing correction in dependence on said estimate of the left motor speed and said estimate of the right motor speed.

10. A controller as claimed in claim 9, wherein said feedback left motor speed is increased by a factor CL given by the formula:

$$CL = \frac{VL_{Real} \cdot VR_{Feedback}}{VR_{Real}} - VL_{Feedback},$$

where $VL_{Feedback}$ and $VR_{Feedback}$ are said feedback left motor speed and said feedback right motor speed respectively, and where $VL_{real}$ and $VR_{real}$ are said estimate of the left motor speed and said estimate of the right motor speed respectively.

11. A controller as claimed in claim 9, wherein said feedback right motor speed is increased by a factor CR given by the formula:

$$CR = \frac{VR_{Real} \cdot VL_{Feedback}}{VL_{Real}} - VR_{Feedback},$$

where $VL_{Feedback}$ and $VR_{Feedback}$ are said feedback left motor speed and said feedback right motor speed respectively, and where $VL_{real}$ and $VR_{real}$ are said estimate of the left motor speed and said estimate of the right motor speed respectively.

12. A controller as claimed in claim 9, wherein said motor control circuitry is configured to limit said slowing correction for said left motor to a magnitude of said estimate of the right motor speed and to limit said slowing correction for said right motor to a magnitude of said estimate of the left motor speed.

13. A controller as claimed in claim 1, wherein said motor control circuitry is configured to reduce said slowing correction when an estimate of the speed of said motorized vehicle is less than a predetermined speed.

14. A controller as claimed in claim 1, wherein said motorized vehicle is a front wheel drive vehicle.

15. A controller as claimed in claim 14, wherein said motor control circuitry is configured only to apply said slowing correction when said front wheel drive vehicle is moving forwards.

16. A controller as claimed in claim 1, wherein said motorized vehicle is a rear wheel drive vehicle.

17. A controller as claimed in claim 16, wherein said motor control circuitry is configured only to apply said slowing correction when said rear wheel drive vehicle is moving backwards.

18. A controller as claimed in claim 1, wherein said loading imbalance arises due to one or more of the following phenomena increasing the loading on one of said left wheel and said right wheel:
(a) friction between at least one of said left wheel and said right wheel and a surface on which the motorized vehicle is driving;
(b) a required realignment of castor wheels of the motorized vehicle when the motorized vehicle is turning;
(c) weight of the user of the motorized vehicle;
(d) a slope on which the motorized vehicle is driving;
(e) a centripetal force; and
(f) climbing or descending an uneven obstacle.

19. A controller as claimed in claim 1, for use in a motorized vehicle taking the form of a wheelchair.

20. A motorized vehicle comprising:
at least a left wheel and a right wheel, said left wheel being driven by a left motor and said right wheel being driven by a right motor;
a user input device configured to issue control signals for the motorized vehicle; and
a controller arranged to receive said control signals from said user input device, the controller comprising:
motor monitoring circuitry configured to monitor output signals from said left motor and said right motor respectively;
left IR compensation circuitry configured to use IR compensation to generate a left motor input voltage in dependence on said output signals, where said output signals comprise a left motor voltage and a left motor current consumption;
right IR compensation circuitry configured to use IR compensation to generate a right motor input voltage in dependence on said output signals, where said output signals comprise a right motor voltage and a right motor current consumption;

said motor monitoring circuitry configured to detect in dependence on said output signals a loading imbalance between said left motor and said right motor; and motor control circuitry configured on detection of said loading imbalance to apply a slowing correction to a less loaded motor of said left motor and said right motor.

21. A motorized vehicle as claimed in claim 20, wherein said motorized vehicle is a wheelchair.

22. A method of controlling a motorized vehicle having at least a left wheel and a right wheel, said left wheel being driven by a left motor and said right wheel being driven by a right motor, comprising the steps of:

receiving control signals from a user input device of the motorized vehicle;

monitoring output signals from said left motor and said right motor respectively;

using IR compensation to generate a left motor input voltage in dependence on said output signals, where said output signals comprise a left motor voltage and a left motor current consumption;

using IR compensation to generate a right motor input voltage in dependence on said output signals, where said output signals comprise a right motor voltage and a right motor current consumption;

detecting in dependence on said output signals a loading imbalance between said left motor and said right motor; and on detection of said loading imbalance applying a slowing correction to a less loaded motor of said left motor and said right motor.

23. An article of manufacture, for use with a motorized vehicle having at least a left wheel and a right wheel, said left wheel being driven by a left motor and said right wheel being driven by a right motor, including computer program instructions stored on a non-transient storage medium that, when executed on a processor, cause the processor to perform actions comprising:

receiving control signals from a user input device of the motorized vehicle;

monitoring output signals from said left motor and said right motor respectively;

using IR compensation to generate a left motor input voltage in dependence on said output signals, where said output signals comprise a left motor voltage and a left motor current consumption;

using IR compensation to generate a right motor input voltage in dependence on said output signals, where said output signals comprise a right motor voltage and a right motor current consumption;

detecting in dependence on said output signals a loading imbalance between said left motor and said right motor; and on detection of said loading imbalance applying a slowing correction to a less loaded motor of said left motor and said right motor.

24. A controller for a motorized vehicle having at least a left wheel and a right wheel, said left wheel being driven by a left motor and said right wheel being driven by a right motor, the controller being arranged to receive control signals from a user input device of the motorized vehicle, the controller comprising:

motor monitoring means for monitoring output signals from said left motor and said right motor respectively;

left IR compensation means for using IR compensation to generate a left motor input voltage in dependence on said output signals, where said output signals comprise a left motor voltage and a left motor current consumption;

right IR compensation means for using IR compensation to generate a right motor input voltage in dependence on said output signals, where said output signals comprise a right motor voltage and a right motor current consumption;

said motor monitoring means being further for detecting in dependence on said output signals a loading imbalance between said left motor and said right motor; and motor control means for, on detection of said loading imbalance, applying a slowing correction to a less loaded motor of said left motor and said right motor.

* * * * *